No. 804,716. PATENTED NOV. 14, 1905.
C. W. GAY.
MACHINE FOR OPENING UP AND END CLOSING KNOCKDOWN CARTONS.
APPLICATION FILED OCT. 22, 1902.

No. 804,716. PATENTED NOV. 14, 1905.
C. W. GAY.
MACHINE FOR OPENING UP AND END CLOSING KNOCKDOWN CARTONS.
APPLICATION FILED OCT. 22, 1902.
9 SHEETS—SHEET 6.

Witnesses:
J. D. Garfield
A. V. Leahy.

Inventor,
Chauncey W. Gay,
by W. H. Bellens
Attorney

No. 804,716. PATENTED NOV. 14, 1905.
C. W. GAY.
MACHINE FOR OPENING UP AND END CLOSING KNOCKDOWN CARTONS.
APPLICATION FILED OCT. 22, 1902.

Witnesses:
J. D. Garfield
A. V. Leahy

Inventor,
Chauncey W. Gay,
by W. J. Bellows
Attorney.

No. 804,716. PATENTED NOV. 14, 1905.
C. W. GAY.
MACHINE FOR OPENING UP AND END CLOSING KNOCKDOWN CARTONS.
APPLICATION FILED OCT. 22, 1902.

No. 804,716. PATENTED NOV. 14, 1905.
C. W. GAY.
MACHINE FOR OPENING UP AND END CLOSING KNOCKDOWN CARTONS.
APPLICATION FILED OCT. 22, 1902.
9 SHEETS—SHEET 9.

Witnesses:
J. D. Garfield
A. E. Leahy

Inventor:
Chauncey W. Gay,
by W. J. Bellows,
Attorney.

UNITED STATES PATENT OFFICE.

CHAUNCEY W. GAY, OF WEST SPRINGFIELD, MASSACHUSETTS.

MACHINE FOR OPENING UP AND END-CLOSING KNOCKDOWN CARTONS.

No. 804,716.     Specification of Letters Patent.     Patented Nov. 14, 1905.

Application filed October 22, 1902. Serial No. 128,301.

*To all whom it may concern:*

Be it known that I, CHAUNCEY W. GAY, a citizen of the United States of America, and a resident of West Springfield, in the county of Hampden and State of Massachusetts, have invented certain new and useful Improvements in Machines for Opening Up and End-Closing Knockdown Cartons, of which the following is a full, clear, and exact description.

This invention relates to a machine for automatically setting up paper boxes or cartons which are supplied to the machine in flat or "knockdown" form.

The object of the invention is to provide means whereby cartons may have the end flaps thereof at one end of the box folded in, stuck, set, and discharged from the machine in set-up condition with the other end left open.

The machine in which this present invention is comprised embodies means for supporting and retaining a pile of the flat or knockdown cartons evenly one above the other; means for feeding the cartons forward one at a time; means operable on the carton for suitably gumming one set of the end flaps which are required to be gummed, and means for opening up the flat carton—that is, causing it to assume the form of a cross-sectionally rectangular tube; means for carrying the opened-up carton onto one of a plurality of revoluble arms or former-carriers, each of which is expanded subsequent to the placing of the carton thereon; means for folding in in proper succession the end flaps, some of which have been previously gummed, for making the closure or end wall of the box; means for imparting a hard pressure against the closed end of the box while retained on the expanded arm of the carrier for giving final form for "setting" the end, and, finally, means for insuring the ejection or stripping of the set-up end carton from off the carrier-arm, leaving the arm ready in its succeeding cycle to receive thereon another opened-up carton which is to be operated upon as was the preceding one.

Various and numerous objects are carried out in the means whereby the gummers for the flaps at one end of the carton are supplied with gum and whereby the gummers and gum-supplying devices are arranged in a practically operative way and with compactness and without impediment to other operating parts of the machine; in the means whereby when a carton is individually fed forward it will be precisely and properly positioned and evened relatively to the devices which operate upon it in its flat form to open it up; in the arrangement for action of the gummers, whereby they serve the double duty of gummers and also of participants in the opening-up operations on the flat carton; in the means and arrangements whereby the cartons, whether they are lined or unlined, may be carried with certainty and without rupture onto one of the revoluble carrier-arms therefor, whereby the closing-in or folding operations of the end flaps will be in proper succession, and so that opposite side flaps will not and cannot have positions to interfere with the initial closing of the relatively right-angular opposite flaps of the box, and whereby in the time a carton is being automatically brought to position on one carrier-arm the carton which had previously been brought on a preceding arm shall have assumed a position in coöperative proximity to the folding devices, the next previously-fed carton being at such time in operative proximity to the end-setting mechanism, while the carton which had next previously been brought onto this carrier-arm has assumed its position in operative proximity to the shedding or stripping mechanism, so that time is economized in having four operations being successively performed on as many of the revoluble carrier-arms.

The invention consists in the various combinations of means or instrumentalities for performing certain operations, coöperating one with another, as hereinafter set forth, and in the construction and combination of parts comprised in the several and various devices for performing individual operations, all substantially as hereinafter more fully described, and set forth in the claims.

Reference is to be had to the accompanying drawings, in which a machine having embodied therein the present invention is illustrated, in which—

Fig. 11 is a plan view of the end portion of the machine of which Figs. 3 and 10 are sectional elevations. Fig. 15ª is a view showing the carton cross-sectionally distorted preparatory to being opened up.

Similar characters of reference indicate corresponding parts in all of the views.

Figure 13:
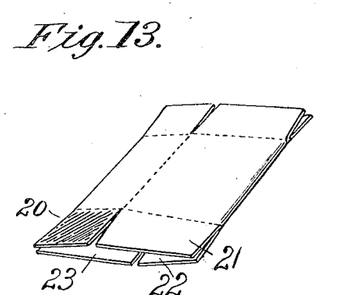
Fig. 13 is a perspective view of the knockdown carton, showing the one of its upper flaps at one end which is exteriorly gummed.
Figure 14:
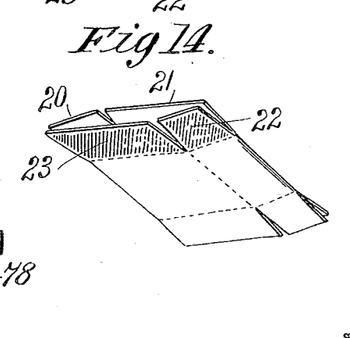
Fig. 14 is a perspective view of the knockdown carton, showing both of its lower flaps at its one end which are exteriorly gummed.

In the drawings Figs. 13 and 14 the form of the carton which this machine works upon is illustrated, the same having flaps 20, 21, 22, and 23 at one end to make, when folded in, the end inclosure of the box, and these cartons are placed in the machine in flat condition in a pile and after being fed forwardly have gum applied, as indicated by the shading in Figs. 13 and 14, on one upper end flap 20 and the two lower end flaps 22 and 23.

Figure 1:
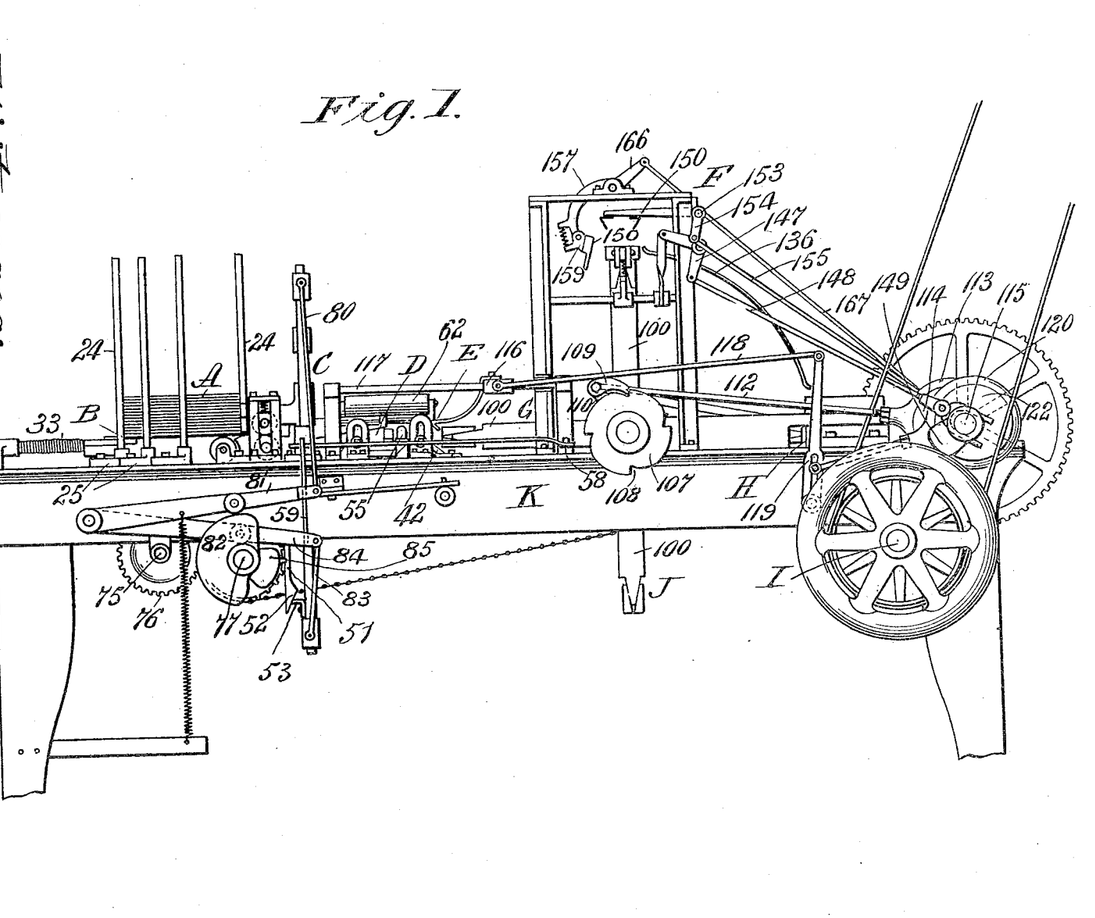
Figure 1 is a side elevation of the machine, the same being a general view provided more especially for the purpose of indicating thereon the locations of the mechanisms by which the various operations are performed.

The pile of cartons A is indicated in Fig. 1 and in the other views as held against lateral displacement within the vertical rods 24 and adjacent the supporting and "shovel-feed" device, (indicated at B.) The shovel-feed mechanism forces the lowermost carton of the pile from the initial end of the machine, where it is supported subject to the devices C C² for gumming the end flaps thereof at the top and bottom and to the opening-up devices D. The former-carrier for the carton having the four radial arms with the contractible and expansible ends is indicated at G, and the device for carrying the carton onto one of the revoluble carrier-arms, which is horizontal and adjacent the opening-up devices, is indicated at E. The devices for folding in the gummed end flaps of the carton on the revoluble arm which had been carried from the horizontal position upwardly a quarter-turn around to the vertical position are indicated at F. The end setting or pressure mechanism is indicated at H, diametrically opposite the place where the opened-up carton is first placed on the carrier-arm, and the carton is stripped from the carrier at J after the carrier has completed three quarter-turns. The driving-shaft of the machine is indicated at I, the same having the driving-pulley and balance-wheel thereon and transmitting through suitable mediums of connection—in some cases gearing, in others sprocket-wheels and chains, eccentrics, and eccentric-rods—motion to the several devices to be hereinafter particularly described.

K represents the elevated bed or supporting-frame for the machine, on which all of the means and mechanisms are mounted.

The gage and retaining-rods 24 are in the form of posts upstanding from slotted base-bars 25, which are held in their adjustments by the set-screws 26, thus allowing adjustment of the posts to correspond to the size of the cartons being operated upon.

Figure 15:
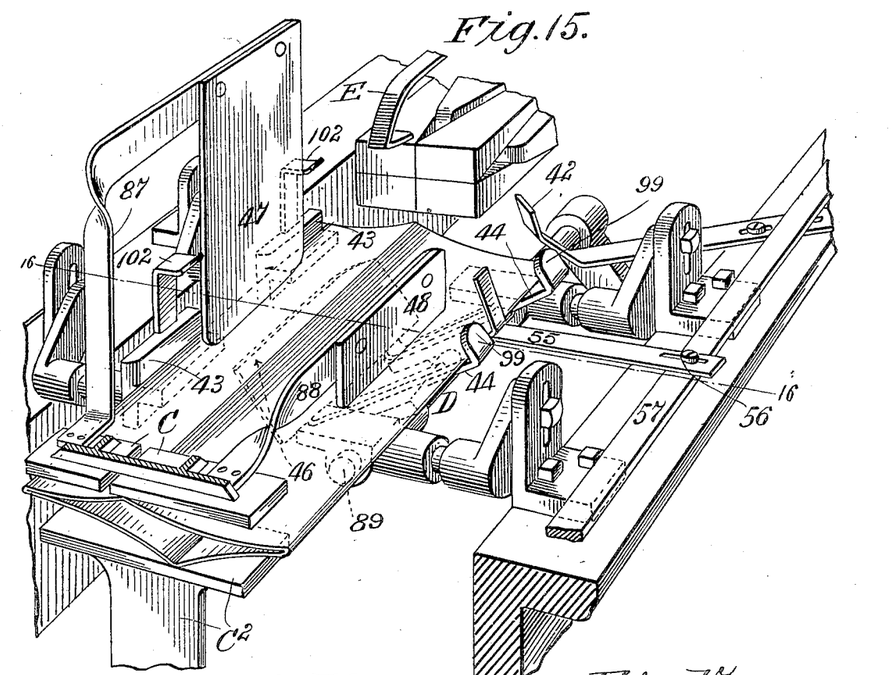
Fig. 15 is a perspective view of the principal devices indicated in Figs. 3, 10, 11, and 12, which are operative to cause the opening up of the flat carton which has been fed from the pile of flat cartons subject to the operation of these devices, it being here mentioned that the positions of some of the parts shown in Fig. 15 are those which they have previous to assuming or having imparted thereto their positions which are shown in Figs. 3, 10, 11, and 12.
Figures 15A, 16, 17:
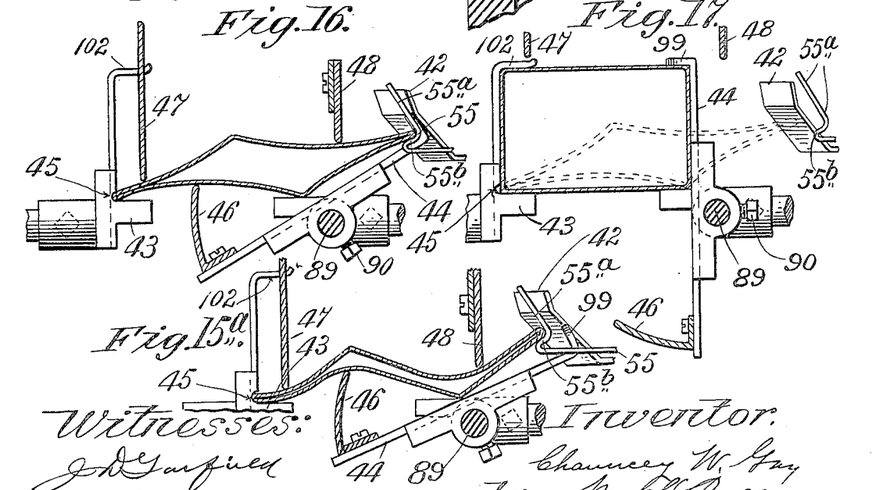
Figs. 16 and 17 are views showing the carton in cross-section and the relation thereto of opening-up devices in stages of the opening-up operation following that portion thereof which is in a manner indicated in Figs. 15ª and 15.
Figure 18:
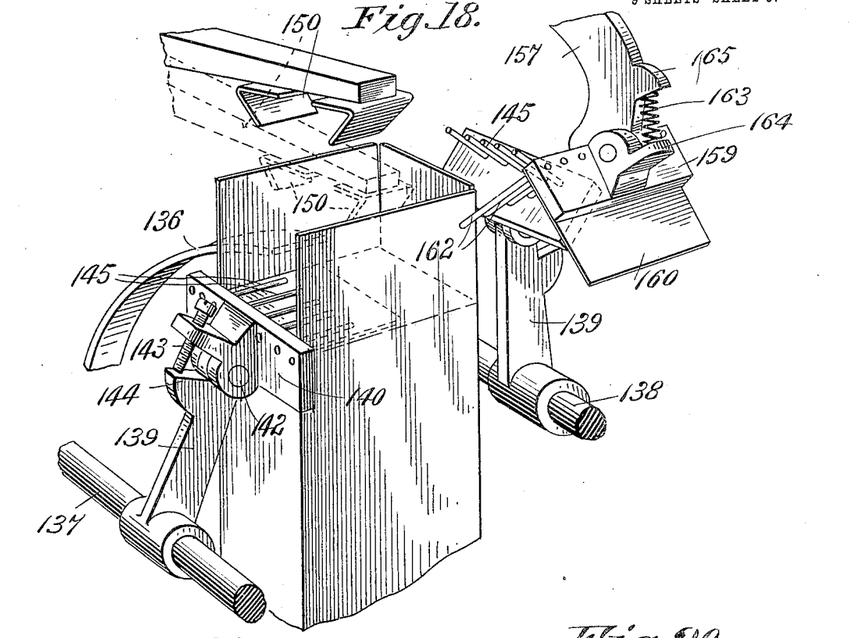
Fig. 18 is a perspective view showing the means cooperating with one of the carrier-arms for folding in the suitably-gummed end flaps of the carton carried on said arm in the proper succession.

The shovel-feed mechanism, comprising, broadly, no particular novelty, is represented in the roll 27 just back of the throat-plate 28, having the aperture 29, the width or height of which aperture is adjustable by means of the adjusting-screw 30, connected to the upper section of the throat-plate, and in the forward marginal portion of a sliding block 31, on which the rear portions of the carton rest, said block having the shoulder constituted by the plate 32 of less thickness than the thickness of the carton. The sliding part 31 is retracted, compressing the spring 33 by the cam 34 and cam-actuated thrust-rod 35. Forward of the throat 29 of the shovel-feed are the feed-rolls 36 and 37, the upper one being spring-pressed toward the lower one, and both are geared together, one being driven through sheave 39 and driving-band 40, operated from the driving-shaft in the most common manner, and the aforementioned supporting-roll 27 has rotation imparted thereto in the proper direction by the crossed belt 41 running around sheaves on the arbors of the rolls 36 and 27. The shovel-feed reciprocating part 31 32 is carried to the rearward edge engagement with the lowermost carton of the pile positively by the cam motion 34 35 aforementioned, the reacting-spring as suddenly and freely permitted by the cam pushing the blank forward, which being furthermore propelled by the feed-rollers is pushed forward against the gage 42 and to a support in a plane somewhat lower than the level of the bottom of the pile of blanks A on the ledges or angular brackets 43 43 at one side and in proximate relation to the tiltable members 44 44, such parts having positions corresponding to longitudinal edges of the flattened tubular carton. The said ledges 43 have notches 45 (see Figs. 16 and 17) in the angle between the shelf-like carton-margin-supporting portion and the upright wall at the rear thereof, such feature of construction being a preferred but not an essential one. The said members 44 44 are normally in a transversely-inclined position relative to the plane in which the carton moves somewhat as shown in Figs. 15 and 16 in order that the upstanding member 46, hereinafter referred to, located at the rear of and having its longitudinal edge ranging with the length of the carton, need not be carried unduly high; but inasmuch as this member 46 below the carton and members 47 and 48 above it are not at all times absolutely necessary the devices might be arranged with the tiltable member 44, shown duplicated in the present instance, normally level, or approximately so.

Arranged closely to the lower feed-roll 37 is a device for jogging the carton forwardly up to the gage or stop 42, the same consisting of a rod 49, normally disposed in a groove in the lower feed-roll, the same being carried on the inner end of a transverse bar 50, which is supported at the upper end of an upright lever 51, intermediately pivoted and having in the edge portion of its lower arm the cam surface or incline 52, with which coöperates a lug 53, which is carried on the vertically-reciprocatory support for the lower gummer $C^2$, (the up and down motions of the upper and lower gummers being imparted by means hereinafter pointed out,) and after this jogging device has had a quick properly-timed movement imparted thereto for the stated purpose it is retracted by the spring 54. The carton is also evened, so that its longitudinal edges are parallel with the line of its progression by the transversely-movable device 55, which is shown in the form of a strip having an end lug $55^a$ and a supporting portion $55^b$ for the front marginal portion of the carton located between the duplicated tiltable members 44, the said part being at 56 adjustably affixed on a long horizontal lever 57, pivoted at 58 at its forward end, (see Fig. 1,) said lever being given its inward swinging movement by the impingement thereagainst of the cam-incline 59, which is mounted on and moves up and down with the cam-lever 84, which gives motion to the lower gummer-support. Said device 55, in addition to supporting and evening the carton, contributes very materially in the opening-up operation imparted thereupon, as hereinafter described.

Figure 10:
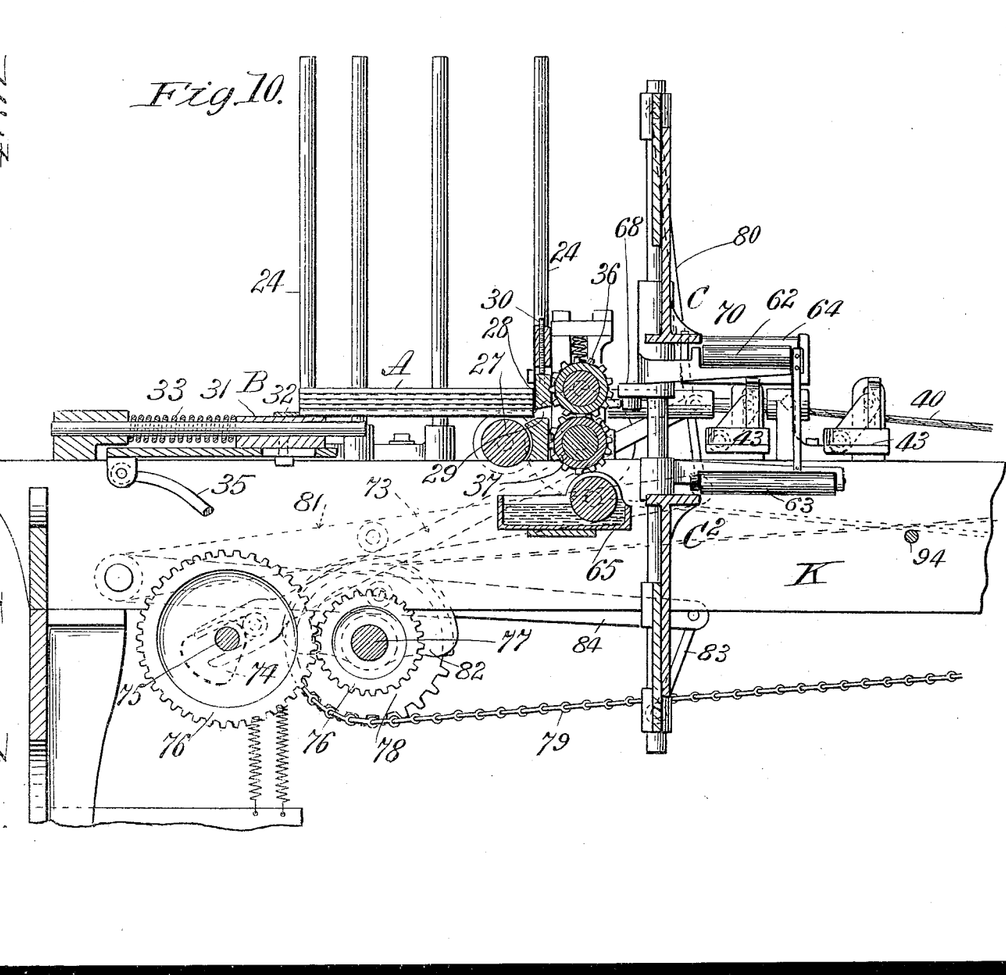
Fig. 10 is a longitudinal sectional view of the same end portion of the machine shown in Fig. 3, but disclosing parts at the opposite side from that illustrated by said Fig. 3.
Figure 11:
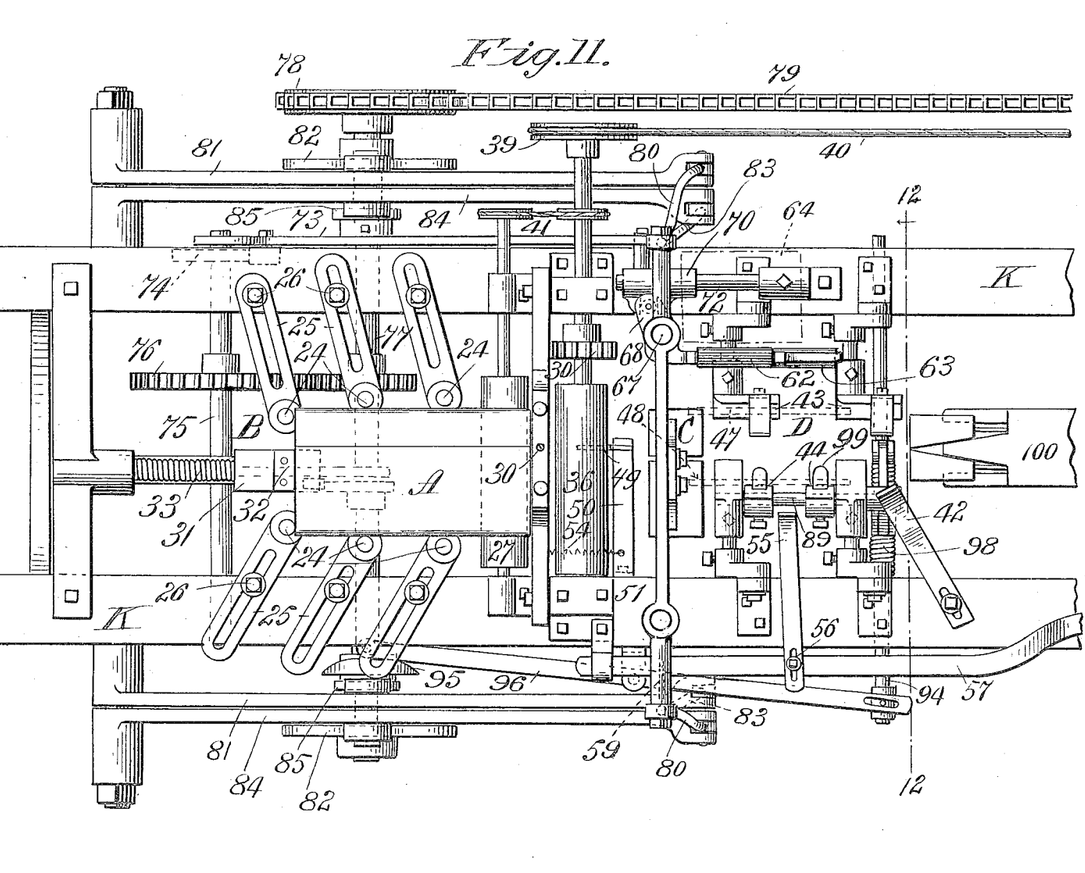

The carton having been brought and squared upon, the supporting and opening-up devices comprised in the ledges and device 55 has the rear-end flaps thereof, which have heretofore been designated by shading and the references 20, 22, and 23, gummed, the gummers C and $C^2$ working toward and from each other in a vertical plane transversely of the machine, receiving the gum thereon while pausing in their upper positions by having the gum-supplying rollers 62 and 63, Figs. 10 and 11, swung across the surface of said gummers from their longitudinal positions one above the other to positions crosswise of the machine, said gum-supplying rollers immediately returning to their original positions. The upper gum-roll 62 has its position of rest next to the gum-box (indicated by the dotted line 64 in Fig. 11 and also indicated in Fig. 10,) while the lower swinging gum-supplying roll takes its gum from the gum-box 65, located under the aforementioned feed-rolls 36 and 37, the latter gum-box 65 being arranged under an intermediate part of the machine and to the rear of the place of gumming the carton, while the gum-box 64 is arranged forward of the place of gumming and toward the rear side of the machine. Each of the gum-rolls is carried on one arm of a right-angled lever pivotally mounted on a vertical axis at 67, which may be one of the stationary vertical guide-rods, on an oppositely-arranged pair of which the gummer-supporting frames have their up and down sliding motions in proper time, and the other arm 68 is suitably engaged with the ear of a longitudinally-sliding sleeve or otherwise formed part 70, movable on the stationary longitudinal rod 72, the slide movement to the part 70 which swings the angular lever on which the upper roll 62 is carried being imparted thereto by the thrust-rod 73, impelled by the cam 74 on a shaft 75 at the initial end of the machine. Said shaft is driven through the gearing 76 76 on a shaft 77, which is provided with sprocket-wheel 78 and chain 79, extended to the drive-shaft end of the machine and driven by a sprocket-wheel thereat.

The upper gummer-frame has a connection by rod 80 with the cam-lever 81, the roll of which is impinged against by the cam 82 (duplicated) on the shaft 77. The carrier-frame for the lower gummer C² similarly has by duplicated link 83, cam-lever 84, and cam 85 its reciprocatory movement imparted thereto. The gummer-actuating cams are so timed that the upper gummer after descending to gum a flap simultaneously with the elevation of the lower gummer to gum the two lower flaps draws away from the gumming-level while the lower gummer still pauses thereat, so that the upper gummer acts to separate the upper layer of the carton from the lower layer, which the lower gummer by its adhesion holds from rising.

The parts 47 and 48 are shown in Figs. 15ª, 16, and 17, and their location is indicated by the dotted lines in Fig. 11 in plan, they having their lower edges ranging longitudinally in parallelism, such lower edges being about at the plane of the gumming-face of the gummer. One of the said members 47 has its bearing near one of the lateral edges of the carton, while the other one, 48, has its bearing position toward the opposite edge of the carton and yet somewhat farther removed from such edge than is the member 47 from the other edge. These members, as shown in Fig. 15, are supported by brackets or extensions 87 88, secured to and projected forwardly from the carrier or support for the upper gummer.

Figure 12:
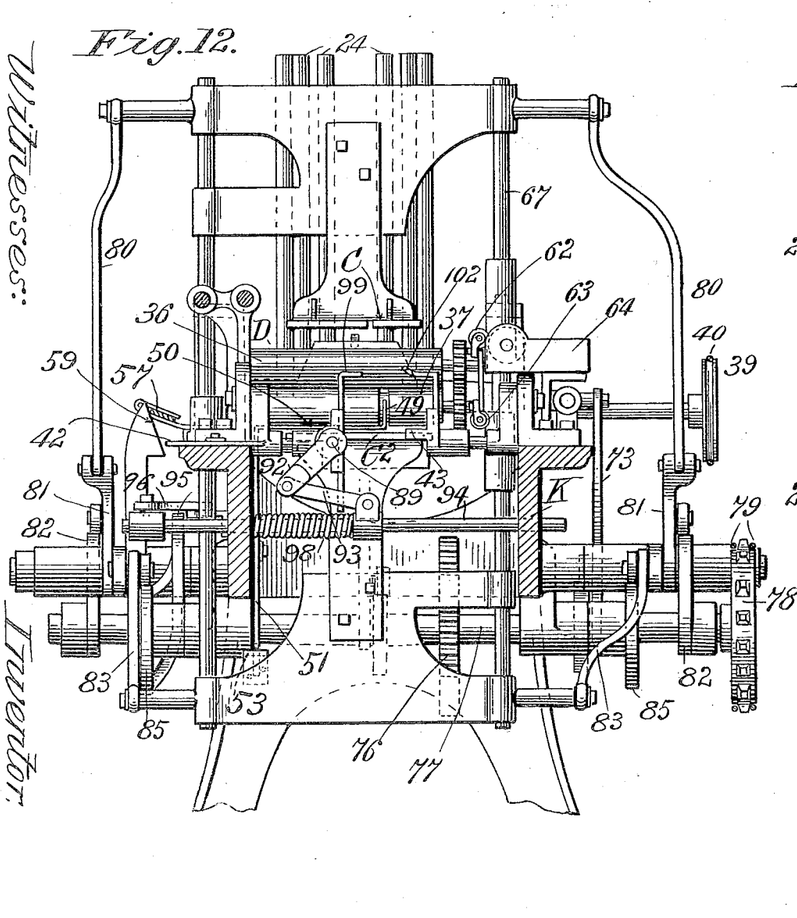
Fig. 12 is an elevation looking from an intermediate portion of the machine, indicated by the line 12 12, Fig. 11, toward the rear or initial end.

The swinging motion of the tiltable members whereby they change positions from that shown in Figs. 15 and 15ª to that shown in Figs. 12 and 17 is imparted by means as follows: The supporting rock-shaft 89, on which the members 44 are secured by the set-screws 90, has, by crank-arm 92 and link 93, Fig. 12, a connection with the earpiece affixed on a reciprocatory rod 94, which is guided for a movement transversely of the machine, the motion to this rod being imparted in one direction by the cam 95 through the lever 96, Fig. 11, against the reaction of the spiral spring 98, the reaction of this spring reversely moving the said rod and parts therewith connected.

The opening-up action is as follows: The carton having come in relation to the devices more or less, as seen in Fig. 15, and being evened to its forward position by an endwise-directed pressure by the part 49, and being also properly evened as to its longitudinal edges by the device 55 and supported at its one edge thereby, and extending therefrom to the opposite marginal support on the ledges 47, and the gummer-pickers having come together against the rear end flaps of the carton it will be perceived that the parts 47 and 48, which are pressure members movable as one with the upper gummer and having positions forward of such gummer, ranging longitudinally, press downwardly on the carton, one near the ledge-supported edge and the other toward the opposite edge adjacent the under crease or longitudinal folding-line of the carton. By such pressure the carton is forced against the upstanding rib 46, carried by the tiltable members, the carton is caused to assume approximately the position shown in Fig. 15ª, wherein it will be seen that the relatively opposite walls of the carton are separated between the angles at the lines of creasing of the carton. As the upper picker-gummer rises, and with it the parts 47 and 48, which are carried thereby, whereby the pinching pressure which was maintained nearly perpendicular to the face of the carton is released and the device 55 is moved farther inwardly, the carton will assume a more nearly opened position, as shown in Fig. 16, at or about which stage the swinging up into a vertical position, such as shown in Fig. 12, of the tiltable device completes the opening up of the carton to the rectangular tubular form, and the carton is therefore in readiness to be moved endwise onto the adjacent horizontally-disposed carrier-arm.

While a device comprised in the members 55 and 44, arranged and having the described movements relatively to means for preventing the carton from receding at its edge opposite that at which such members are operative, is efficient to open up cartons composed of a quality of stock most favorable to the opening-up action, the members 46, 47, and 48, arranged as described and shown, are important and valuable as contributing to that certainty and completeness of the opening-up operation of cartons made from all characters of stock, which insures that every blank after being fed to the position to be gummed, will be in proper condition to be telescoped onto the adjacent arm 100 of the carrier device, and it will be noticed that the devices 44, with their end lugs 99, and the bases and risers of the ledges 43, with the horizontal lugs 102 extended from the risers forwardly, as shown in Figs. 12 and 17, when in the relations of the final stage of the opening-up operations, act as squarers for the carton in coincidence with the adjacent carrier-arm 100.

To prevent the tilting downward of the rear end of the carton when resting on the supports during and before the opening of the same, a support consisting of a bar 50 is provided, such bar having a position corresponding approximately to the level of the blank indicated by the Figs. 15 and 15ª.

A portion of the machine which comprises the plurality of radial revoluble carrier-arms 100, which also serve as forms for the body portion of the opened-up carton, has its location forwardly beyond the opening-up devices, which have been described. These radial arms are mounted upon a central body 106, Fig. 2, suitably journaled and provided with a disk or wheel 107, having ratchet-teeth 108 in number corresponding (in the present instance four) to the number of the radial carrier forms or arms 100. Coacting with the ratchet-tooth wheel 107 is a pawl 109 on a pawl-carrier 110, pivotally supported on the journal for the body which carries the radial arm, and with this pawl-carrier the extension-rod 112 of an eccentric-strap 113 is connected, the eccentric 114, which coöperates with the strap, being affixed on a counter-shaft 115, having a gear connection with the driving-shaft I of the machine.

While an arm 100 is pausing with its end adjacent the opening-up devices, the tiltable member 44 of which is in the carton-squaring position, (shown in Fig. 2,) the drag-hook E is given a forward motion from its position of engagement with the rear edge of the opened-up carton to move the latter forward upon the carrier-arm, the retreating movement of said hook device to a position considerably to the rear of that shown in Fig. 1 and movement forwardly to such position shown being imparted by mounting the hook on the sliding carrier 116, which slides on the horizontal rod 117, connected by the connecting-rod 118 with a pivotally-mounted lever 119, with which the extension of the eccentric-strap 120 is adjustably connected, said strap encircling the eccentric 122 on the aforementioned shaft 115. By moving the point of connection between the eccentric-strap extension and the lever 119 outwardly or inwardly, as manifestly may be done on reference to Fig. 1, the extent of the reciprocatory movement of the drag-hook E may be increased or lessened.

The end portions of the carrier arms or forms 100 consist of members 124. (More particularly indicated in Figs. 5, 6, and 8.) These members are constituted by blocks having ends squared with two outer right-angularly-arranged sides, the two inwardly angularly arranged sides 125 being inclined from the outer ends of the blocks toward their inner ends and adapted to fit in the outwardly-divergent recesses constituted by the margins 126, Fig. 9, which are inclined of the endwise portions 127 at the extremities of the arms proper, 100, which are tubular, leaving space for occupancy therein of a block 128, which is located therein and adapted for an inward and outward reciprocatory movement. The inner ends of a plurality of wire or spring fingers 129 are secured to said block 128, the outer ends of these fingers being outturned, as indicated at 130, and having connection with the inner faces of said wedge-shaped blocks 124.

Figures 4, 5, 6, 7, 8, 9:
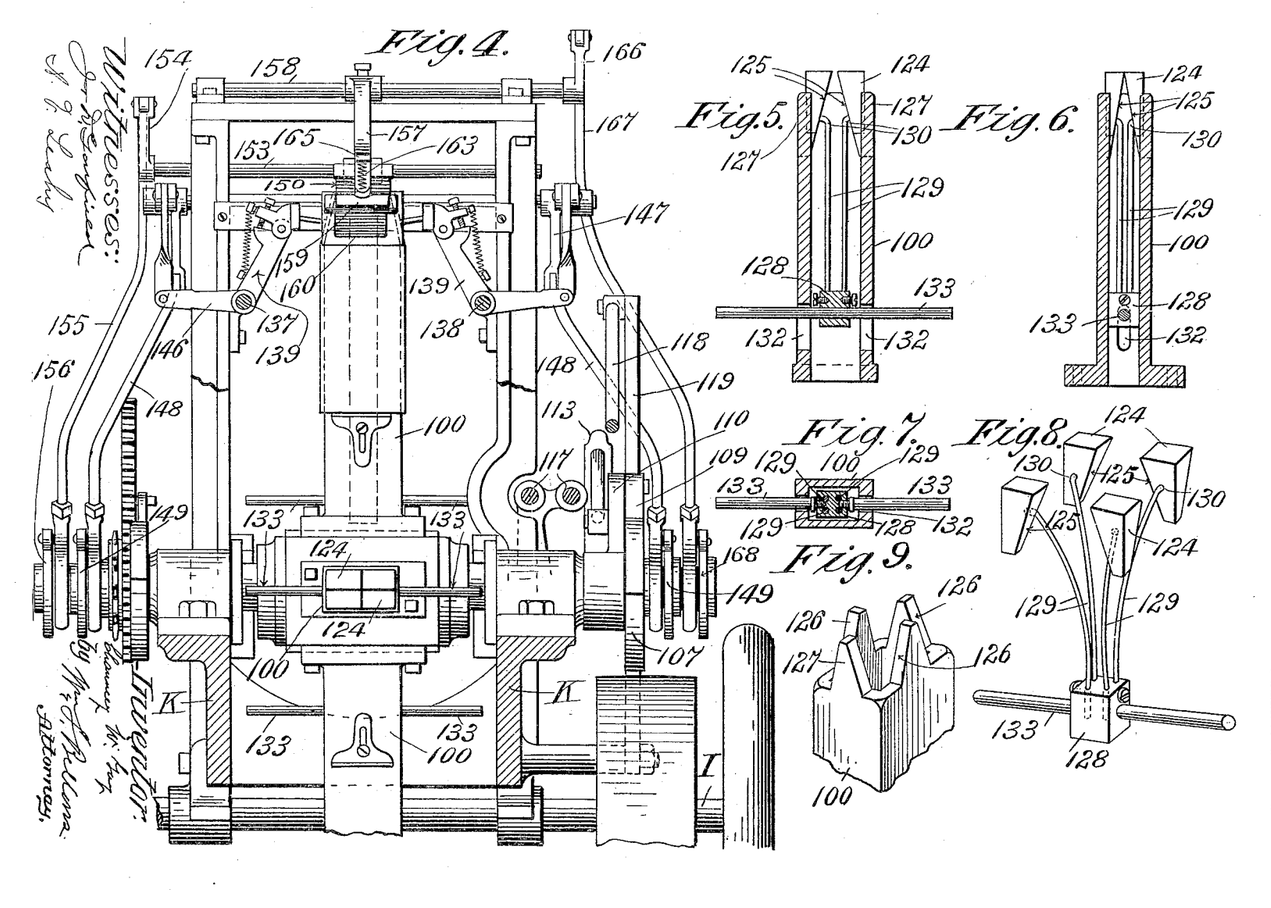
Fig. 4 is a cross-sectional view and elevation as seen beyond the plane indicated by the line 4 4, Fig. 2, in the direction of the arrow thereon.
Figs. 5, 6, 7, 8, and 9 are sectional and perspective views showing the construction of one of the carrier-arms for the opened-up carton, embodying a contractible and expansible end portion.

The outward movement of the block 128 endwise outwardly through the spring-fingers 129 endwise outwardly moves the blocks 124, and the stress or tension of such fingers 129 being inwardly relatively to the longitudinal center line of the arm 100 causes the blocks 124 to have projections in contracted relations, as indicated in Figs. 1, 5, and 6, beyond the end of the arm proper. The expansion to give to the sectionally-formed arm end a slightly greater cross-sectional bulk than that of the arm proper is insured by the reversed and inward movement, which is seasonably imparted to the internal slide-block 128 for the blocks, which are then drawn by the spring-fingers endwise inwardly and in impingement against the inclined surfaces 126 are by the latter crowded to their transversely-expanded relations. It will be explained that Fig. 8 represents the relations of the blocks 124 as when endwise inwardly drawn and transversely outwardly crowded, the fingers 129 here being understood as sprung or deflected from their normal inwardly-disposed positions.

The opposite side walls of the tubular arm proper, 100, is slotted, as indicated at 132, through which studs 133 project, said studs being rigidly affixed to the block 128.

Figure 3:
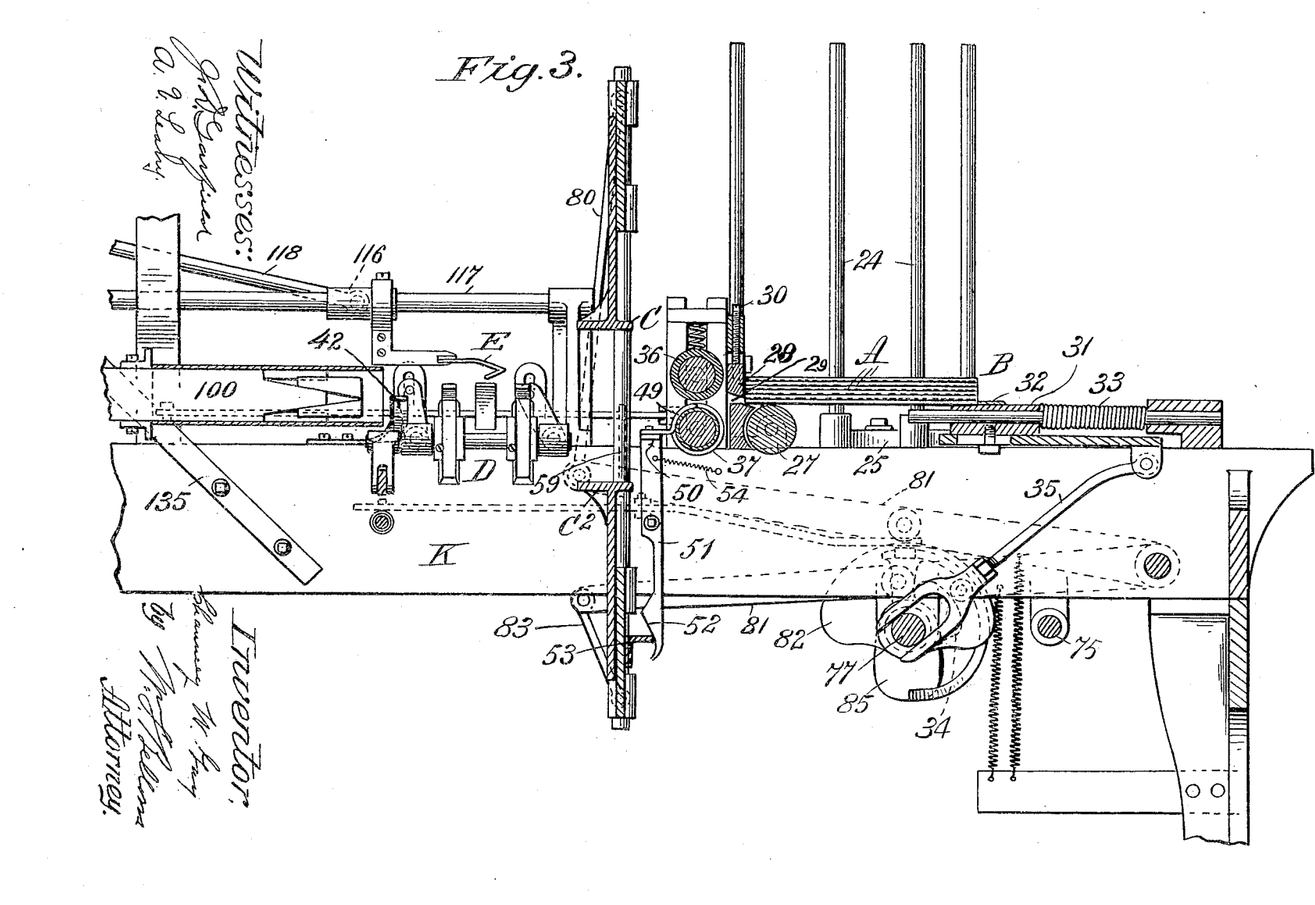

The block 128 at the time the carrier-arm 100 is brought in line with the opening-up devices (shown in Fig. 3) is in its outward position through means which will be hereinafter pointed out, and the end-forming blocks 124 are therefore constrained to assume their projected and contracted relations, so that the section of the carrier-arm is less than the cross-sectional dimensions of the opened-up carton, and the latter may be readily pushed onto the arm without liability of its being torn.

Figure 2:
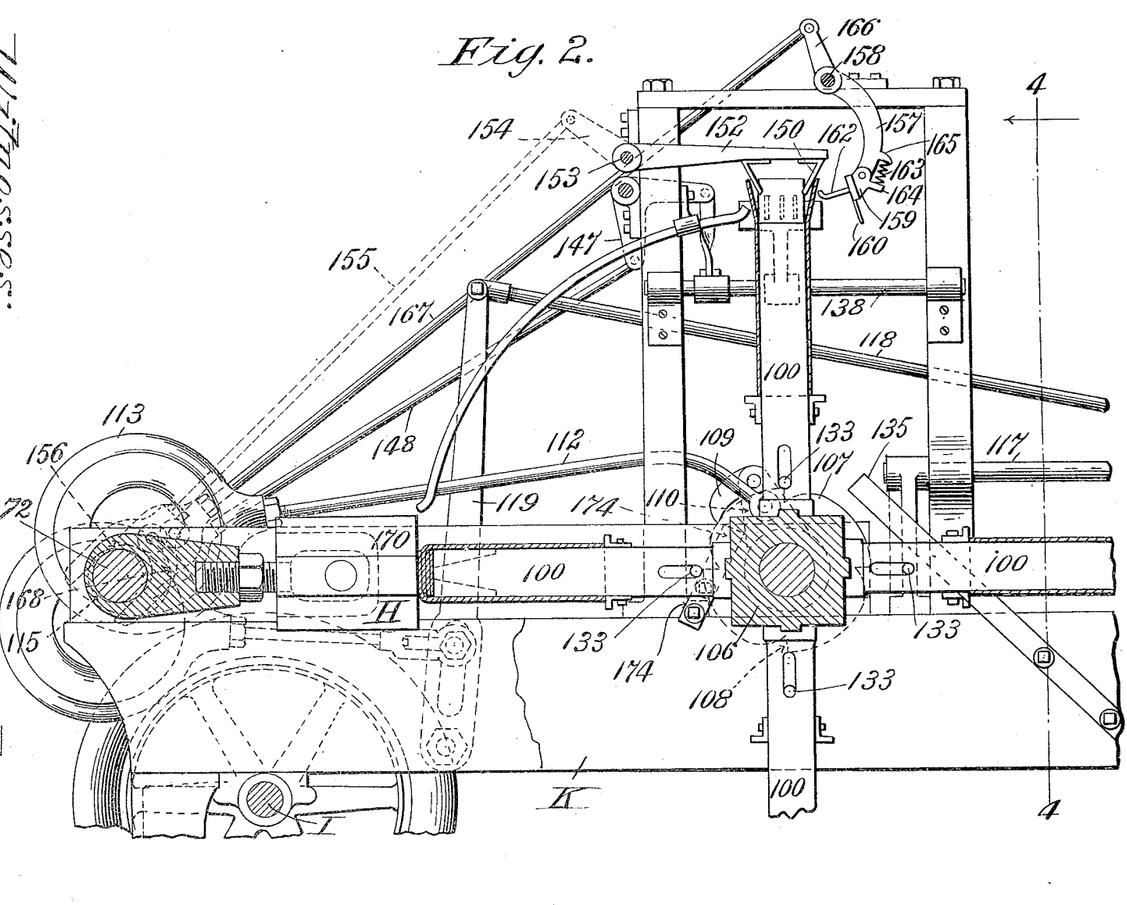
Figs. 2 and 3 together constitute substantially a central vertical longitudinal section of the machine.

The transference of the carton from the opening-up devices onto the carrier-arm having been accomplished while the arm is at rest, the next quarter-turn of the carrier, whereby it is carried around to the carton end inturning devices, carries the stud 133 of the block 128 into engagement with the cam 135, Fig. 2, and forces the block 128 inwardly, thus spreading the block, which then serves as a proper form against which to perform the folding operation and insures the firm retention of the latter upon the arm. The revoluble carrier-arm having made its quarter-turning movement and stopped with its upstanding extremity adjacent the side-flap folders, (shown in Figs. 1, 2, 4, and 18 to 20,) these folders are actuated in succession, the flaps being folded in one above the other. One of the remaining flaps is next turned down, after which the carrier-arm makes another quarter-turn and carries the remaining endwise-projected flap against the stationary curved plate 136, which bends it down closely on the three previously-inturned flaps.

On either side and arranged longitudinally of the machine are horizontal rock-shafts 137 138, on which are affixed arms 139, each having at its extremity a member 140, connected thereto by a hinge-joint 142, and having an adjustable abutment-screw 143 passing through a lug on the part 140 and bearing against the shoulder 144 of the arm 139. The hinge-connected member 140 has one or more of flap-engaging fingers 145. The means for imparting the rocking movements to the rock-shafts 137 138 is clearly shown in Figs. 1 and 4 and consists of a lever-arm 146, secured to and projected from the shaft and connected to an angular lever 147, which is oscillated by the thrust-rod 148, actuated by a cam 149 on the aforementioned counter-shaft 115. The cams for the respective opposite lateral flap inturning devices are timed so that one operates in advance of the other.

In order that when the lateral flaps are being inturned the relatively right-angular opposite flaps may be outwardly temporarily spread, so as to be free of and non-obstructing to the flaps to be first inturned, a spreading device (indicated at 150 and consisting of downwardly-tapering plates) is provided, carried at the extremity of the lever-arm 152, which is affixed on a rock-shaft 153, to which the crank-arm 154 is affixed, said crank-arm being connected with the cam-operated thrust-rod 155, and in this connection the dotted line 156, Fig. 2, designates the cam or eccentric which primarily actuates said spreader 150.

Figures 19, 20:
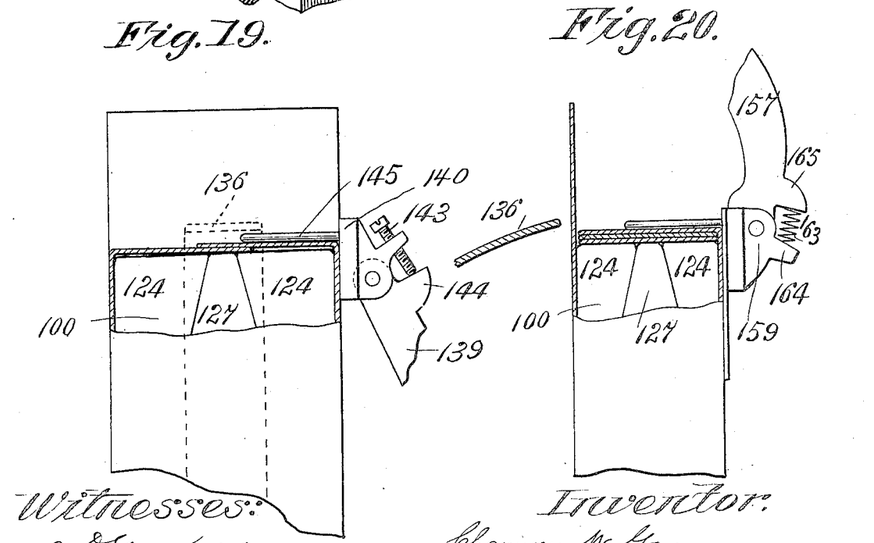
Fig. 19 is a partial sectional view through the carton from edge to edge and the end portion of the carrier-arm therefor, the first flap being indicated as folded down, as also is the second and opposite flap, and showing the operating portion of the device which performs the folding-down operation for such second flap.
Fig. 20 is a similar view to Fig. 19, but made at right angles thereto, showing the device for folding down the third flap in relation to the relatively opposite first and second flaps, previously folded, and indicating how under the bodily movement of the carrier and the box thereon the fourth flap will be folded down directly onto the previously-folded third flap.

The inturning device for the rearward flap (shown in Fig. 18) comprises a lever-arm 157, mounted on the transverse rock-shaft 158, it having a member 159 hinged at its extremity and provided with a plate or member 160 and a member or plurality of fingers 162 at right angles thereto, said member 159 having a spring 163 applied between a lug 164 thereof and a lug 165 of the arm 157, which spring serves to maintain a proper normal relation of the member 159 to the arm 157, on which it is hinge-connected, and yet to permit the right-angular portions 160 and 162 to adjust themselves in squared proximity and contact to and upon the extremity of the carrier-arm 100 and to fold the third flap in against the end thereof, as seen in Fig. 20. The reciprocatory movement of the lever-arm 157 imparted by the rocking of the shaft 158 is insured by the connection with the rock-shaft arm 166 of the cam-operated thrust-rod 167, 168 being the dotted-line indication of the cam or eccentric.

The folding-in operations having been performed up to the extent designated in Fig. 20, the then next quarter-turn of the carrier-arm causes the remaining flap to be, by the curved plate having its position and contour adjacent the path of the end of the carrier-arm, wiped in and turned against the other flaps, so as to be properly subject to the end forcing and setting actions of the eccentric-operated pressure-slide 170, located at the extreme forward end of the machine and having its slight degree of horizontal reciprocatory movement imparted thereto by the eccentric 172 on the aforementioned counter-shaft 115. (Indicated by the full-line sectionally-shaded circle in Fig. 2.) Three of the flaps, as indicated in Figs. 13 and 14, having received gum externally thereon are caused to adhere and be set firmly one to the next and to the fourth flap, which properly should not be gummed, a good squared formation and closure of the carton end being assured by the coaction of the said pressure-slide relatively to the still expanded extremity of the carrier-arm 100. The next step of the carrier-arm causes the block-controlling studs 133 to impinge against the duplicated inclined or cam bars 174, Fig. 2, so that said studs will be crowded toward the outer end of the carrier-arm, causing the blocks to contract, and so contract the carrier.

Various changes and modifications may be made in the specific details of construction of the individual devices which are organized in the machine for opening up and end-closing knockdown cartons without departing from this invention. Moreover, the machine is constructed with a view to adjustability of various of its parts and devices, whereby it may be made adaptable for performing the stated operations in the manner substantially as described upon cartons of varying sizes and proportions.

Inasmuch as machinery has been devised and developed by myself and another for making and printing cartons and delivering them with an offset sheet of material between every two of the cartons, which cartons are placed at the initial end of the machine in the position indicated in Figs. 1, 3, 10, and 11, it becomes necessary to insure removal of these sheets from the cartons being fed. This removal, it will be perceived, is readily performed in the most simple manner by the action of the roller 27, hereinbefore referred to as driven by the cross-belt in the reverse direction from the feed-rollers 36 and 37. When by the shovel-feed mechanism and said rolls 36 and 37 the bottom carton and the protective sheet next thereunder is pushed forwardly, the roll 27, rotating reversely of the direction of feeding rotations of the rolls 36 and 37 and in frictional contact on the under side of the lowermost protective sheet, moves such sheet backwardly, allowing it to fall under the portion of the machine at which the support and gage devices for the supply-pile is located.

Having thus described my invention, what I claim, and desire to secure by Letters Patent, is—

1. In a machine of the character described, the combination with means for opening up a flattened carton into tubular form, of means for feeding the carton to the opening-up means, and a device located between the feeding means and the opening means for applying gum to the rear end portion of the carton brought in relation to the said opening means.

2. In a machine of the character described, the combination with an opening-up device for a flattened carton, and a gummer device located adjacent and to the rear of the opening-up device, said gumming device being operable previous to the actuation of the opening-up device.

3. In a machine of the character described, the combination with devices for opening up a flattened carton, of parts reciprocating toward and from each other, and having upon the closing together thereof, contact upon the opposite side of the flattened carton, and means for applying gum upon the face of one of said reciprocatory parts.

4. In a machine of the character described, the combination with a device for opening up a flattened carton, of two reciprocatory gummers operating toward and away from the level of the flat carton, means for supplying gum upon said gummers, and means for imparting approaching and separating movements thereto whereby one gummer recedes from the other while the other still remains stationary for the purpose set forth.

5. In a machine of the character described, the combination with a device for opening up a flattened carton to tubular form, of means for feeding the flattened carton to the opening-up device, a device for forwardly jogging and evening the flattened carton in relation to the opening-up device and a gage against which the forward end of the carton is pushed by the evening device, having its location corresponding to the forward end and toward one longitudinal edge of the carton.

6. In a machine of the character described, a device for opening up a flattened carton, means for feeding the carton thereto, and a device operative against the carton for evening it with relation to the properly longitudinal disposition of its opposite edges.

7. In a machine of the character described, the combination in an opening-up device therein for a flattened carton, of a stationary carton-margin support and carton-edge abutment, of a part movable and operative relatively to the opposite edge of the carton comprising a member for supporting the marginal portion of the carton, and a member to have a bearing engagement against the adjacent edge of the carton, means for imparting an inward motion to said marginal-supporting and edge-engaging device and for withdrawing the same, a member tiltably mounted to have a following motion relatively to the opening carton, and means for imparting thereto a reciprocatory swinging movement.

8. In a machine of the character described, in combination, a device for opening up a flattened carton, comprising a bottom marginal support and an edge abutment, means for supporting the opposite edge portion of the carton, a device for edgewise pressing, at such latter edge portion of the carton, thereagainst, in a transverse direction, a tiltable follower operable at the edge portion of the carton, and a gummer for gumming the rear end portion of the carton.

9. In a machine of the character described, the combination with a device for opening up a flattened carton, of means for feeding the flattened carton thereto, a device for forwardly jogging and evening the flattened carton, a device for transversely forcing and evening the carton, and means for gumming the rear end portion of the flattened carton.

10. In a machine of the character described, the combination in an opening-up device therein for a flattened carton, of a stationary support for one edge portion of the carton, and an adjacent edge abutment, of a movable part operative relatively to the opposite edge of the carton comprising a member for supporting the marginal portion of the carton, and a member to have a bearing engagement against the edge of the carton, means for imparting an inward movement of said edge supporting and engaging device and for withdrawing the same, means for feeding the flat carton to the aforesaid devices, and means for applying gum upon a rear end portion of the carton.

11. In a machine of the character described, the combination in an opening-up device therein, for a flattened carton, of a carton-edge-supporting ledge 43, having a rear abutment-wall provided with the forwardly-extending lug 102, of a part operative relatively to the opposite edge of the carton comprising a member for supporting the marginal portion of the carton, and a member to have a bearing engagement against the adjacent edge of the carton, means for imparting an inward movement of said front edge marginal supporting and edge engaging device and for withdrawing the same, and a member tiltably mounted to have a following motion relatively to the opening carton, and means for imparting thereto a reciprocatory swinging movement.

12. In a machine of the character described, the combination with a carton margin support and edge abutment, of an oppositely-disposed approximately horizontal member 44, having an upstanding edge lug 99, and tiltably mounted and adapted to be swung into a vertical plane, means for imparting the reciprocatory tilting movements to said member 44, and means for feeding cartons in juxtaposition to said marginal support and tiltable device.

13. In a machine of the character described, the combination with a carton margin support and edge abutment, of the device 55 comprising carton-margin support $55^b$ and edge abutment $55^a$ together with means for imparting transverse reciprocatory movements to said device, and the tiltable member 44, having a position under and corresponding to the carton margin, and provided with the upstanding lug 99, together with means for imparting the tilting reciprocatory movements to said member 44 for the purposes set forth.

14. In an opening-up device for cartons, in combination, a carton-margin-supporting ledge having an upstanding abutment comprising a wall with a notch in the angle between the ledge and rising wall, an opposite edge support for the carton, and means for imparting a transverse pressure, edgewise against a carton on said ledge and opposite support.

15. In a machine of the character described, in combination, a longitudinal marginal support and edge abutment, and an opposite marginal support, for a longitudinally-creased flattened carton, means for feeding the carton thereto, parts located behind said carton-supports, and having opposed reciprocatory movements perpendicular to the plane of feed of the carton, one or both thereof having gummers for the end portion of the carton, a device carried by one of said reciprocatory parts, and arranged for a distorting pressure against the carton between its longitudinal edges, and means for imparting pressure transversely against one of the longitudinal edges of the carton.

16. In a machine of the character described, in a carton opening-up device, a part comprising a longitudinal marginal support and edge abutment for the carton, means constituting an opposite longitudinal marginal carton-support, members, bearing along longitudinal lines at opposite sides of the carton and at locations offset from each other, and intermediate between the longitudinal margins of the carton, which are operative to distort the latter from its plane form, means for imparting approaching and receding motions of said members toward and from the opposite surfaces of the carton, and a reciprocatory device operative to exert a transverse forcing pressure edgewise against the carton.

17. In a machine of the character described, a part comprising a longitudinal marginal support and edge abutment for the carton, means constituting an opposite longitudinal marginal support, members bearing along longitudinal lines at opposite sides of the carton and at locations offset from each other, and intermediate the longitudinal margins of the carton, operative to distort the latter from its plane form, means for imparting approaching and receding motions of said members toward and from the opposite surfaces of the carton, a reciprocatory device operative to exert edgewise a transverse forcing pressure against the carton and a part for following the edge wall of the opening carton having a swinging motion, and means for imparting such swinging motion thereto.

18. In a machine of the character described, in combination, a longitudinal marginal support and edge abutment, and an opposite marginal support, for the carton, a normally approximately horizontal tiltable follower device having a longitudinal rib adapted to engage the under side of the carton, a reciprocatory gummer, operable on the upper rear end portion of the carton and having a forward longitudinally-ranging member adapted to bear along an intermediate portion of the carton at its upper side on a line offset from the bearing of the aforesaid rib, a device for exerting a pressure at an edge of the carton in a transverse direction, and means respectively for operating the latter device and for operating the tiltable follower.

19. In a machine of the character described, in combination, a longitudinal marginal support and edge abutment, and an opposite marginal support for the carton, a normally approximately horizontal tiltable follower device having longitudinal upstanding rib adapted to engage the under side of the carton, a reciprocatory gummer, operable on the upper rear end portion of the carton and carrying two longitudinally-ranging members 47 and 48 adapted to bear along on intermediate portions of the carton at its upper side on a line offset from the bearing-line of the aforesaid rib, a device for exerting a pressure at an edge of the carton in a transverse direction, and means respectively for operating the latter device, and for operating the tiltable follower.

20. In a machine of the character described, means for feeding longitudinally-creased and flattened cartons, in combination with a carton-support, means operable against the carton for cross-sectionally distorting it and retirable therefrom, and means for imparting an edgewise pressure against the carton concurrently with the retirement of the carton-distorting means.

21. In a machine of the character described, means for feeding longitudinally-creased and flattened cartons, in combination with a carton-support, means operable against the carton for cross-sectionally distorting it and retirable therefrom, a gummer operable against an end portion of the carton, and retirable therefrom, and means for imparting an edgewise pressure against the carton concurrently with the retirement of the carton-distorting and the gumming means.

22. In a machine of the character described, means for feeding longitudinally-creased and flattened cartons, in combination with a carton-support comprising a side wall, means operable against the carton for cross-sectionally distorting it and retirable therefrom, means for imparting an edgewise pressure against the carton concurrently with the retirement of the carton-distorting means and a tiltable member for exerting pressure transversely inwardly against the partially-opened carton, and means for swinging said tilting member from an approximately horizontal position into an upright position parallel with the said rear side wall.

23. In a machine of the character described, the combination with devices for opening up a flattened carton, and means for feeding the carton thereto, of oppositely operative gummers movable toward and from each other, each serving as a platen for the other and means for supplying gum upon one or both of said gummers.

24. In a machine of the character described, the combination with a carton-support, and means for feeding a flat carton thereto, of upper and lower reciprocatory parts, one of which has a gumming-face and the other thereof serving as a support against which the gum-face part works, a gum-box, a gum-supplying roll mounted for a quadrantal movement from the gum-box across the gumming-face and return, and means for imparting the reciprocatory quadrantal movement to gum-supplying roll.

25. In a machine of the character described, the combination with a support for a flattened carton, and means for feeding flattened cartons successively thereto, of gummers C and $C^2$ movable for reciprocatory movements toward and from each other at opposite sides of the carton, respectively provided gumming-boxes and upper and lower gum-rolls, arranged for quadrantal reciprocatory movements across the faces of the gummers, having at the extremes of their movements, gum-taking relations to the gum-boxes, one of said gum-supplying rolls being longer than the other and means for imparting the reciprocatory movements to the gumming-rolls.

26. In a machine of the character described, a form and carrier-arm for a tubular carton having its end constructed with inclines, and blocks or sections having inclined surfaces engaging the inclines of the arm and adapted through longitudinal movements of said sections, to have expanded and contracted relations, in combination with a block longitudinally movable internally of the arm and a plurality of spring members connected to said block and also to the several end-constituting sections.

27. In a machine of the character described, a form and carrier-arm for a tubular carton having its end constructed with inclines, and mounted for a revoluble movement, blocks or sections having incline surfaces engaging the inclines at the end of the arm and adapted through longitudinal movements thereof, to have spreading and approaching relations, a block longitudinally movable in the arm having an outwardly-projecting stud, a plurality of spring members connecting said block and said end sections means for imparting the revoluble movement to the carrier-arm and a cam-surfaced part adjacent the path of movement of the arm with which the said stud coacts.

28. In a machine of the character described, the carrier-arm 100 constructed hollow, having inclined edged fingers at its end and a slot through its side wall, the plurality of blocks having right-angularly-formed outer surfaces, and inclined inner faces engaging the edges of said fingers, a block endwise movable within the hollow arm provided with a stud projecting through said slot, and the plurality of spring-rods connecting the latter block with the several first-named blocks.

29. In a machine of the character described, the carrier-arm 100 constructed hollow, having inclined edged fingers at its end and a slot through its side wall, the plurality of blocks having right-angularly-formed outer surfaces, and inclined inner faces engaging the edges of said fingers, a block endwise movable within the hollow arm provided with a stud projecting through said slot, and the plurality of spring-rods connecting the latter block with the several first-named blocks, in combination with means for imparting a movement bodily to said arm and a cam-bar, with which said stud coöperates in the movement of the arm.

30. In a machine of the character described, the carrier-arm 100 constructed hollow, having inclined edged fingers at its end and a slot through its side wall, the plurality of blocks having right-angularly-formed outer surfaces, and inclined inner faces engaging the edges of said fingers, a block endwise movable within the hollow arm provided with a stud projecting through said slot, and the plurality of spring-rods connecting the latter block with the several first-named blocks, in combination with carton and inturning members and means for operating them, and a pressure member and means for imparting reciprocatory movements thereto, means for imparting intermittently-revoluble movements of the carrier-arm whereby, it travels to location adjacent and proceeds beyond said inturning members, and said pressure members, a cam with which the aforesaid stud coacts in the approach of the arm to the inturning members, and another cam with which said stud coacts in the passage of the arm away from the said pressure members, for the purposes set forth.

31. In a machine of the character described, the combination with means for supporting a flattened carton of upper and lower gummers, vertical guides on which the gummers are movable toward and from each other, cams, cam-levers and thrust-rods appurtenant respectively to the upper and lower gummers, for the purpose described.

32. In a machine of the character described, the combination with upper and lower gummers, vertically movable toward and away from each other, and means for imparting their movements thereto, of two horizontally-arranged gum-supplying rolls, a carrier on which both are supported, pivotally mounted for a partial revoluble movement back and forth, across the faces of the gummers, a crank-arm provided to said support, a slide with which the crank-arm is engaged, and means for imparting reciprocatory movements to said slide.

33. In a machine of the character described, the combination with upper and lower gummers, vertically movable toward and away from each other, and means for imparting their movements thereto, of two horizontally-arranged gum-supplying rolls, a carrier on which both are supported, pivotally mounted for a partial revoluble movement back and forth, across the faces of the gummers, a crank-arm provided to said support, a slide with which the crank-arm is engaged, a thrust-rod connected to said slide, and a cam coacting with the thrust-rod.

34. In a machine of the character described, the combination with upper and lower gummers vertically movable toward and away from each other, cams, cam-levers and thrust-rods appurtenant respectively to the upper and lower gummers, of two gum-supplying rolls horizontally arranged and having a pivotally-mounted carrier therefor provided with a crank-arm, a slide with which the crank-arm is engaged and means for imparting its reciprocatory movements thereto.

35. In a machine of the character described, the combination with means for supporting a flattened carton, means for feeding the carton forwardly onto said support, a gummer operable upon an end portion of the carton, being capable of a reciprocatory movement, a lug 53 provided on a part of the gummer device, means for reciprocating the gummer, a lever intermediately pivotally mounted and having a pusher or jogger member 49, to forwardly adjust the carton, and said lever having a cam-incline 52 with which the aforesaid lug 53 cooperates.

36. In a machine of the character described, the combination with a carton-support and means for feeding a carton thereto comprising upper and lower feed-rolls 36 and 37 one of which has a peripheral groove, of an intermediately-pivoted upright lever 51 having the cam-incline 52, and the transverse horizontal extension 50, provided with the upwardly-extending pusher member, and a reciprocatory part carrying the lug 53 which coacts with the cam-incline.

37. In a machine of the character described, the combination with a supporting-ledge 43, an opposite edge carton-supporting device, and a tiltable follower member 44, a rock-shaft on which said member is fixed, having a crank-arm, a slidable rod linked to said crank-arm, a cam-actuated lever connected to said rod, and a retracting-spring for the rod.

38. In a machine of the character described, the combination with a rear edge-supporting ledge 43, and a device 55 comprising a bar having a supporting-step $55^b$ and an abutment member $55^a$ for operation edgewise relatively to a carton as explained, of a pivotally-mounted lever 57, a bar having a cam-surface 59 and a reciprocatory support on which said bar is mounted and positioned relatively to the said lever.

39. In a machine of the character described, opening-up devices for a flattened carton comprising in combination, the rearwardly-located ledge 43 having upright extension with a horizontal upper lug 102, the device 55 having the step $55^b$ and the abutment $55^a$, a horizontally-swinging lever on which the device 55 is mounted, a cam imparting reciprocatory movement to said lever, the tiltable member 44 having angularly-turned end portion 99, a rock-shaft on which said member is mounted, having a crank-arm, a slide-rod 94, having a connection with said crank-arm, and means for imparting reciprocatory movements to said slide-rod.

40. In a machine of the character described, the combination with the intermittently-operable revoluble carrier-arm, of oppositely-arranged carton-flap-inturning devices, and means for actuating them, a lever having a spreader comprising members arranged inclined to each other and means for reciprocating the lever.

41. In a machine of the character described, the combination with a revoluble carrier-arm 100 of a swinging member having a lug 144, and having a secondary member 140 hinged thereto, and provided with a lug and with flap-inturning fingers 145, and a screw adjustably engaged through one of said lugs and having a limiting-abutment against the other.

42. In a machine of the character described, in combination a support for a supply of flattened cartons, a support onto which the cartons are to be fed in succession, feeding means, means for adjusting the carton fed, means for gumming rear end portions of the carton, means for distorting the carton from its normal cross-sectional line, means for imparting edgewise pressure against the carton, a tiltable follower operable against the upturning edge portion of the carton, a revoluble intermittently-operable carrier-arm and form for the opened-up carton, a device for pushing the opened-up carton to telescope about said arm, and carton-flap-inturning devices to which said arm transfers the carton, and means for actuating said devices.

43. In a machine of the character described, the combination with supporting and forwardly-feeding means for flattened cartons and interposed protective sheets, of means operable to withdraw the protection-sheet from its surface-contact against the carton.

44. In a machine of the character described, the combination with a support for a supply-pile of flattened cartons and interposed protective sheets of forwardly-feeding devices for the cartons, and a roll having a position for frictionally bearing on the protective sheet next to each carton being fed, and means for imparting a rotation to said roll whereby it feeds said sheet in a backward direction, and reversely of the direction of feed of the carton.

Signed by me at Springfield, Massachusetts, in presence of two subscribing witnesses.

CHAUNCEY W. GAY.

Witnesses:
WM. S. BELLOWS,
A. V. LEAHY.